(12) United States Patent
Northrop

(10) Patent No.: US 9,764,977 B2
(45) Date of Patent: Sep. 19, 2017

(54) PROCESS FOR THE TREATMENT OF BIOLOGICAL MATERIALS AND WASTEWATER

(75) Inventor: Jere Northrop, Amherst, NY (US)

(73) Assignee: Timberfish, LLC, Amherst, NY (US)

( * ) Notice: Subject to any disclaimer, the term of this patent is extended or adjusted under 35 U.S.C. 154(b) by 334 days.

(21) Appl. No.: 13/821,744

(22) PCT Filed: Sep. 12, 2011

(86) PCT No.: PCT/US2011/051200
§ 371 (c)(1),
(2), (4) Date: Jul. 25, 2013

(87) PCT Pub. No.: WO2012/034118
PCT Pub. Date: Mar. 15, 2012

(65) Prior Publication Data
US 2013/0292329 A1   Nov. 7, 2013

Related U.S. Application Data

(60) Provisional application No. 61/381,658, filed on Sep. 10, 2010.

(51) Int. Cl.
| | |
|---|---|
| *C02F 11/02* | (2006.01) |
| *C02F 3/32* | (2006.01) |
| *C02F 3/04* | (2006.01) |
| *C02F 3/02* | (2006.01) |
| *B09C 1/10* | (2006.01) |

(Continued)

(52) U.S. Cl.
CPC ............. *C02F 11/02* (2013.01); *B09C 1/10* (2013.01); *C02F 3/04* (2013.01); *C02F 3/105* (2013.01); *C02F 3/32* (2013.01); *C02F 3/02* (2013.01); *C02F 2103/20* (2013.01); *C02F 2103/32* (2013.01); *C02F 2103/343* (2013.01); *C02F 2201/007* (2013.01); *C02F 2203/004* (2013.01);

(Continued)

(58) Field of Classification Search
CPC .... C02F 11/02; C02F 3/02; C02F 3/04; C02F 3/32; C02F 3/105; C02F 2103/20; C02F 2103/32; C02F 2103/343; C02F 2201/007; C02F 2203/004; C02F 2303/10; B09C 1/10; Y02W 10/30
USPC ....... 210/602, 605, 615, 616, 617, 621, 622, 210/623, 630, 631, 903, 906
See application file for complete search history.

(56) References Cited

U.S. PATENT DOCUMENTS

| | | |
|---|---|---|
| 6,193,889 B1 | 2/2001 | Teran et al. |
| 2003/0111408 A1* | 6/2003 | Austin et al. ................ 210/601 |

(Continued)

FOREIGN PATENT DOCUMENTS

| | | |
|---|---|---|
| JP | 2006-296423 A | 11/2006 |
| JP | 2007-090131 A | 4/2007 |

(Continued)

*Primary Examiner* — Fred Prince
(74) *Attorney, Agent, or Firm* — The Webb Law Firm

(57) ABSTRACT

A process in which a waste stream containing microbes and organic constituents is passed through a process environment comprising a solid media, microbes, and higher animals, such that some of the microbes and/or organic constituents within the waste stream are removed from the waste stream and some of the removed microbes are destroyed or consumed by the higher animals. The process environment may include an irrigated environment, a submerged environment, or a combined environment.

16 Claims, 10 Drawing Sheets

(51) Int. Cl.
*C02F 3/10* (2006.01)
*C02F 103/20* (2006.01)
*C02F 103/32* (2006.01)
*C02F 103/34* (2006.01)

(52) U.S. Cl.
CPC .......... *C02F 2303/10* (2013.01); *Y02W 10/15* (2015.05); *Y02W 10/30* (2015.05)

(56) References Cited

U.S. PATENT DOCUMENTS

| | | |
|---|---|---|
| 2006/0086662 A1 | 4/2006 | Ogden |
| 2007/0227972 A1* | 10/2007 | Buelna .................... C02F 3/04 210/617 |
| 2007/0289922 A1 | 12/2007 | Ladron de Guevara et al. |
| 2008/0194003 A1 | 8/2008 | Northrop |
| 2011/0127215 A1* | 6/2011 | Gencer .................... C02F 3/06 210/617 |

FOREIGN PATENT DOCUMENTS

| | | |
|---|---|---|
| WO | 99-01385 A1 | 1/1999 |
| WO | 03-091160 A2 | 11/2003 |

* cited by examiner

PROCESS FOR THE TREATMENT OF BIOLOGICAL MATERIALS AND WASTEWATER

CROSS-REFERENCE TO RELATED APPLICATION

This application claims priority to U.S. Provisional Application No. 61/381,658, filed Sep. 10, 2010 entitled "Process for the Treatment of Biological Materials and Wastewater", the entire disclosure of which is herein incorporated by reference.

BACKGROUND OF THE INVENTION

Field of the Invention

The invention relates to a system for treatment of biological materials and wastewater and, more particularly, a system for the separation of microbial biomass from an aqueous liquid from which it was produced.

Description of Related Art

The biological treatment of aqueous liquids containing organic materials and nutrients has been employed in many different configurations for well over 100 years. Applications include food production, agriculture, wastewater treatment, pharmaceuticals preparation, and the like. Most of these applications involve the growth of microorganisms, principally bacteria, which bioconvert the organic materials and nutrients in the aqueous liquids into carbon dioxide, water, various other products, and microbial cell biomass. The microorganisms usually are grown in suspended growth systems or in fixed film systems. Virtually all of these processes produce a biological mass, and this biological mass is often associated with other materials such as particulate solids or other non soluble materials that are present in the aqueous liquids. Often, it is desirable to separate the biological masses, and associated particulate and non-soluble materials, from the aqueous liquids being treated. This may occur after or during the treatment process itself.

There are many different processes for performing such separations. Commonly used procedures include gravity settling or floatation, or a wide variety of mechanical procedures involving filtration, centrifugation, screening, and the like. Such processes and procedures produce a mixture of biological masses and associated particulate and non-soluble materials, which are often termed "sludge", which must be periodically removed from the treatment or production process and utilized or disposed of in some manner. Methods of disposal of sludge that are commonly used include land application, containment in landfills, incineration with disposal or reuse of ash, or similar methods.

Prior to disposal, it is often common for biological sludge to be stabilized by one or more stabilization processes. These processes are designed to reduce the volatile content of the sludge, reduce the volume of the sludge, destroy pathogens, reduce or minimize the likelihood that bacteria can grow in the processed sludge, and to reduce or eliminate odors.

Two processes commonly used for biosolid sludge stabilization include aerobic digestion or anaerobic digestion. These two processes use microorganisms, mostly bacteria, to bioconvert organic materials in the biosolids into carbon dioxide and water, and in the case of anaerobic digestion, methane. After all or most of the biosolids material has been reacted, both processes produce a microbial biomass which is either not susceptible to further reaction, or which only reacts relatively slowly compared with the design performance of the basic stabilization processes.

This stabilized sludge or microbial biomass contains bacteria and other microorganisms which contain significant amounts of carbon and nutrients such as nitrogen, phosphorus, and the like. The carbonaceous materials and nutrients that are constituents of these organisms are generally impervious to further action by either the wastewater treatment or other process from which they were obtained, or to the anaerobic or aerobic digestion processes which may have been used to stabilized them. Hence they must be removed from the treated liquid stream and be disposed of in a suitable manner.

SUMMARY OF THE INVENTION

In accordance with an embodiment of the invention, a process including a waste stream containing microbes and organic constituents is passed through a process environment comprising a solid media, microbes and higher animals, such that some of the microbes and/or organic constituents within the waste stream are removed from the waste stream and some of the removed microbes are destroyed or consumed by the higher animals.

The process environment may be an irrigated environment. In another configuration, the process environment may be a submerged environment. In yet another embodiment, the process environment is a combined environment comprising an irrigated environment and a submerged environment.

The waste stream may be an effluent stream from at least one of an activated sludge wastewater treatment system, a biological nutrient removal treatment system, a confined animal facility operation, a food processing facility, and/or a pharmaceutical processing facility. Optionally, the waste stream may include animal manure.

In one embodiment, at least some of the liquid exiting the process environment having a first total solids value is recycled into the process environment for further treatment. In another embodiment, the liquid exiting the process environment after being recycled into the process environment has a second total solids value, the second total solids value being less than the first total solids value.

The process of the present invention may also include a low oxygen nitrification-denitrification bioreactor in communication with the waste stream. Optionally, the process may include a second low oxygen nitrification-denitrification bioreactor in communication with the waste stream.

In certain configurations, the higher animals produce at least some nitrogenous waste and the nitrification-denitrification system converts at least some of the nitrogenous waste to dimolecular nitrogen that is discharged to atmosphere. In other configurations, the process includes an organism collector in flow communication with the waste stream of the process environment to remove at least some higher animals from the process environment. Optionally, the waste stream may include at least some solid material. In another configuration, the process environment includes an irrigated biofilter.

DETAILED DESCRIPTION

Figure 1:
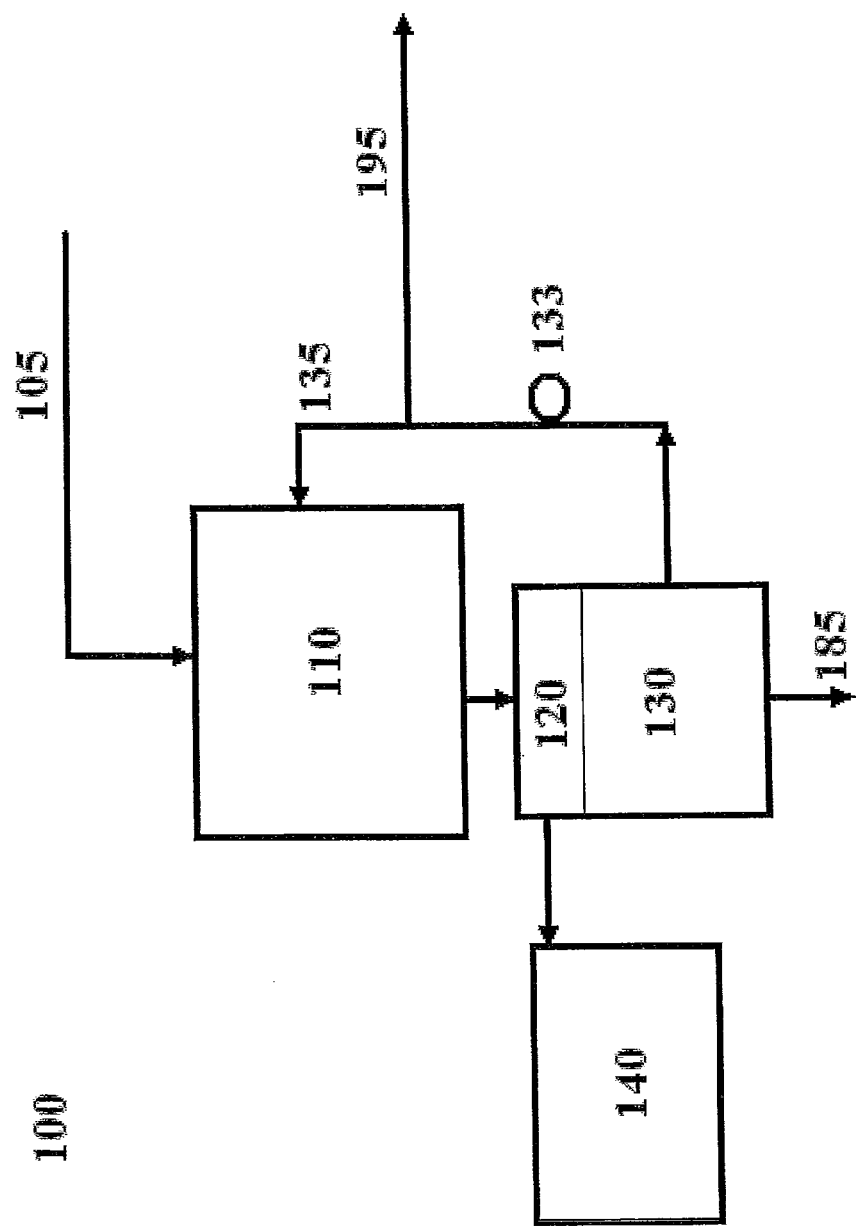
FIG. 1 is a schematic representation of an irrigated environment in communication with a treatment or production system in accordance with an embodiment of the present invention.

The present invention is directed to a process in which excess sludge or microbial biomass, either stabilized or unstabilized, can be separated from an aqueous liquid from which it was produced or obtained, collected, and further processed. This additional processing may produce additional products, some of which may have significant value, and an additional waste stream containing dead bacteria and organic fragments resulting from the death of bacteria. The resulting waste stream can be reintroduced back into the wastewater treatment process, or back into the stabilization process, from which its material was originally obtained, or into a new treatment process, for further treatment. This process applies to both stabilized and unstabilized sludges and biomasses.

In accordance with an embodiment of the present invention, the system will include introducing a microbial biomass or biosolid containing microorganisms, and in particular bacteria, into an environment where they can be consumed by higher organisms. These higher organisms could range from protozoa, to any of a variety of invertebrates such as worms, insects, snails, crustaceans, or the like, or to various vertebrates such as fish, turtles, amphibians, reptiles, birds, or mammals.

The environment containing the higher organisms may include conventional fixed film processes, suspended growth processes, or a combination of both processes. The fixed film processes may be supported by biodegradable material such as wood chips, sawdust, various agricultural waste materials, or the like, or by other media which is not itself biodegradable but is supportive of microbial growth on its surfaces. This environment may act as a filter in that both the microbes themselves and the biological masses, and associated particulate and non-soluble materials, may be removed from the aqueous liquid. In one embodiment of the invention, the particulate and non-soluble materials which are separated from the aqueous liquid themselves become part of the fixed film media. These materials then provide surfaces for additional microbial growth and act to further remove new biological masses and associated particulate and non-soluble materials.

The suspended growth processes may comprise a variety of biological flocs containing microorganisms, invertebrates, and a variety of other biological substances and associated particulate and non-soluble materials. The microorganisms may comprise bacteria, protozoa, algae, and other plants and animals.

Once the biosolid or microbial biomass has been consumed by the higher organisms, part of the cellular structures of the microorganisms will be destroyed by the ingesting organism, and some of the carbonaceous material and nutrients will be converted into the biomass of the consuming higher organisms for growth and reproduction. The remainder of these materials will be excreted by the higher organisms.

The excreta of the higher organisms contains materials that can once again be successfully treated by the originating wastewater treatment or other production processes or by the biological processes used to stabilize the original biosolids or microbial biomasses. This may reduce the total volume and weight of material which ultimately must be disposed of by landfilling, land application, incineration, or the like.

The higher organisms which also result from the process of the invention can then be collected for removal or other use such as feed for animals, soil conditioners, or the like. Any partially degraded organic material used in the fixed film processes, such as wood chips, sawdust, various agricultural waste materials, or the like, can be separated from the microbial biomasses, invertebrates, or other animals and used an energy source.

The process of the invention can be applied to any biological waste or wastewater treatment process used for the reduction of suspended solids and biochemical oxygen demand. These would include municipal wastewater treatment facilities as well as a variety of commercial and industrial biological treatment process as used, for example, in the food processing industries, restaurants, and the like.

Furthermore, the process of the invention can be used to treat sludges and microbial biomasses resulting from a wide variety of Multi-Stage Activated Sludge ("MSAS") and Biological Nutrient Removal ("BNR") processes. In general MSAS and BNR processes have been designed and applied to nutrient containing organic wastewater streams such as municipal wastewater, food processing wastes, or animal manure wastes stemming from confined animal feeding operations ("CAFOs"), to reduce nutrient pollution resulting from the discharge of excess nitrogen and phosphorus into the environment.

As described above MSAS and BNR processes also produce an excess microbial biomass which is a result of the MSAS or BNR treatment process and which needs suitable final disposal. In general, BNR processes focus principally on the treatment and removal of nitrogen and phosphorus whereas MSAS processes also focus on the removal of organic constituents comprising Biochemical Oxygen Demand (BOD) and Chemical Oxygen Demand (COD). These objectives are usually accomplished with separate biological processes but can often be combined in one treatment system.

Nitrogen is biologically removed from organic and waste streams through a process of nitrification and denitrification. The nitrification process step involves the oxidation of the nitrogen in ammonia, ammonium ions, or organic nitrogen containing compounds such as proteins, nucleic acids, or the like. The nitrogen is first oxidized to nitrite by one set of autotrophic bacteria generally characterized by the *Nitrosomas* species, and then to nitrate by a second set of autotrophic bacteria generally characterized by *Nitrobacter* species. The oxidation process steps require that at least some oxygen be present in the environment of the bacteria and the ammonia/organic nitrogen substrate.

The denitrification process step then converts the nitrite or nitrate into Bimolecular nitrogen gas which is then discharged to atmosphere. This process generally occurs in the absence of oxygen, or in environments containing very low oxygen concentrations, which stimulates the denitrifying bacteria to seek the oxygen that is chemically bound in the nitrite and nitrate formed by the nitrifying bacteria. A wide range of bacteria have the capability to perform denitrification processes.

Thus, the conventional nitrification-denitrification process requires that the waste stream containing the nitrogen be exposed to both an aerobic and an anaerobic environment. It has also been found that the nitrification-denitrification process can work if an anoxic environment is substituted for the aerobic environment conventionally used. In this case, free molecular oxygen does not have to be present in the specified environment, however, some other form of electron acceptor must be available to serve as an electron acceptor for the oxidation of the ammonia. An example of this process would be the anaerobic ammonium oxidation ("Anammox") process.

Both the nitrification and denitrification processes are accompanied by cell growth of the appropriate bacteria and hence, these processes also produce an excess microbial biomass or sludge which must be periodically removed from the treatment system. The growth and reproduction of these microorganisms limits the amount of ammonical and organic nitrogen that can be converted into dimolecular gas as some of the nitrogen is retained within the bacteria themselves. Generally this limits the conversion of ammonical and organic nitrogen into dimolecular nitrogen gas to less than 80 percent, often less than 60 or 70 percent of the total influent nitrogen. The rest must be disposed of in the form of sludge or microbial biomass.

In accordance with an embodiment of the present invention, the percentage of influent ammonical and organic nitrogen which can be converted into diomolecular nitrogen gas can be substantially increased to 95 to 98 percent. This is accomplished by feeding the microbial biomass comprising *Nitrosomas, Nitrobacter*, denitrifiers, and related species to various higher animals and then returning the wastes excreted by these higher animals back to the nitrification-denitrification treatment system. The higher animals will remove a small fraction of the nitrogen contained within the bacteria and assimilate it into their cell mass. The rest will be excreted but it will now be in a form which the nitrification-denitrification system can further process. This results in the conversion of much of the recycled nitrogen into dimolecular nitrogen gas that can then be discharged into the atmosphere.

The second process central to BNR, and often to MSAS, concerns the removal of phosphorus from waste streams. Phosphorus, like nitrogen, is an essential element in biological organisms, and hence will be taken up into a biological cell mass as biological organisms grow and reproduce. In BNR processes, this accumulation of phosphorus is enhanced by establishing varying environmental conditions which the bacteria are exposed to in an alternating manner. Thus, bacteria which are exposed to alternating aerobic and anaerobic environments, or aerobic and anoxic environments, will exhibit luxury phosphorus uptake into the bacterial biomass in the aerobic zone. This means that bacteria in the aerobic zone will remove more phosphorus than they need for growth and reproduction in the aerobic zone, and will store this excess phosphorus as polyphosphate. When the organisms are then exposed to anaerobic or anoxic conditions, they will use this stored polyphosphate as an energy source.

If this microbial biomass containing the stored polyphosphate is removed from the aerobic zone of the wastewater treatment system, it will remove increased amounts of phosphorus when compared with conventional biological processes that do not contain alternating aerobic and anaerobic/anoxic environments. Thus, removal of part of the microbial biomass is essential for all biological phosphorus removal processes.

In the process of the invention, if the bacteria containing excess phosphorus stored as polyphosphate are fed to higher animals, then some of the phosphorus will be retained in the bodies of the higher animals and some will be excreted by these animals. Removal of the higher animals from the treatment process will thus constitute removal of some of the phosphorus from the wastewater stream. The phosphorus excreted by the higher animals can then be returned to the wastewater treatment system where it will again undergo the treatment process.

This process can be enhanced if the microorganisms, and in particular those microorganisms containing extra phosphorus stored as polyphosphate, are fed either to vertebrate higher animals, or to a series of invertebrate animals which are in turn fed to vertebrate animals. This occurs because the bones and shells of vertebrate animals contain large quantities of calcium phosphate and hydroxyapatite whereas the shells of invertebrates contain mostly calcium carbonate. Given that the soft tissues of both vertebrates and invertebrates contain approximately similar concentrations of phosphorus, the preferential removal of vertebrate animals will increase the fraction of phosphorus removed per unit of body weight of the animals removed from the treatment process.

Given that there are many BNR processes which remove both nitrogen and phosphorus, the process of the invention can be used in conjunction with such processes to also remove both nitrogen and phosphorus. If excessive amounts of nitrogen are discharged to atmosphere as dimolecular nitrogen gas, then there may not be sufficient quantities of nitrogen to generate sufficient higher animal biomass to meet desired phosphorus removal levels. In such cases, chemical precipitation of phosphorus, for example with a metallic salt such as ferric chloride, may be required for final effluent discharge. Treatment with metallic salts is often a technique used in MSAS systems for removal of phosphorus. In such cases the metallic salt is usually added to one or more of the activated sludge or other type bioreactors and then the resulting residue containing precipitated phosphorus is removed with the excess sludge.

Various embodiments of the process of the invention utilize modular environments for the growth of microorganisms and invertebrates. In these cases, microbial biomasses or biosolids containing microorganisms, and in particular bacteria, are introduced into such modular environments, wherein they are retained, wherein additional microorganisms may be grown, and wherein many of such microorganisms may be consumed by higher organisms such as invertebrates or vertebrates. In these embodiments of the process of the invention, the modular environments act as filtration and wastewater treatment systems.

One such modular process environment, called an irrigated environment, 100, is shown in FIG. 1. The irrigated environment is connected in fluid communication to a treatment or production system such as an activated sludge wastewater treatment system, a biological nutrient removal treatment system, a confined animal facility operation, a food processing facility, or the like. The irrigated environment receives an influent stream 105 from the treatment or production system and returns a treated effluent stream 195 back to that treatment or production system. The irrigated environment may also send, via communication channel 185, the treated effluent stream to another treatment system or may discharge part, or all, of the treated effluent stream as a final effluent.

The irrigated environment may include an irrigated body of media including biodegradable materials such as wood chips, sawdust, agricultural wastes, and the like, or non-biodegradable materials such as plastic media structures, sand, or the like. The media is arranged in a pile or stack, and may be contained in a tank, bunk silo, or other structure which bounds the media and contains it in a defined area. In FIG. 1, this constrained media area is shown as 110. Aqueous liquids containing microbial biomasses and/or biosolids are introduced at the top of such a body of material and allowed to trickle down through the media thereby exposing the contained biomasses, biosolids, and any accompanying soluble organic material or nutrients, to additional microorganisms and invertebrates which may consume, attach, or otherwise assist in removing them from the aqueous liquid.

Once the aqueous liquid has passed through the body of media it may pass through a selector device 120 to remove any larger invertebrates or aggregates of microorganisms, and then is delivered to a vessel, tank, or the like shown in FIG. 1 as 130. The removed invertebrates or aggregates of microorganisms are collected in an Invertebrate Collector 140. While in the tank 130, the liquid may be aerated or subjected to other treatment. Some fraction of this liquid is then recycled via flow path 135 back to the top of the irrigated environment media area 110. Another part of this treated recycle stream may be returned to the original treatment or production system via flow path 195. Usually these recycle functions are performed by a pump 133. The non-recycled liquid in 130 may be discharged out of the irrigated environment module via flow path 185 and may be sent to another treatment system, may be discharged as an effluent stream, or may be split between a combination of these alternatives.

Figure 2:
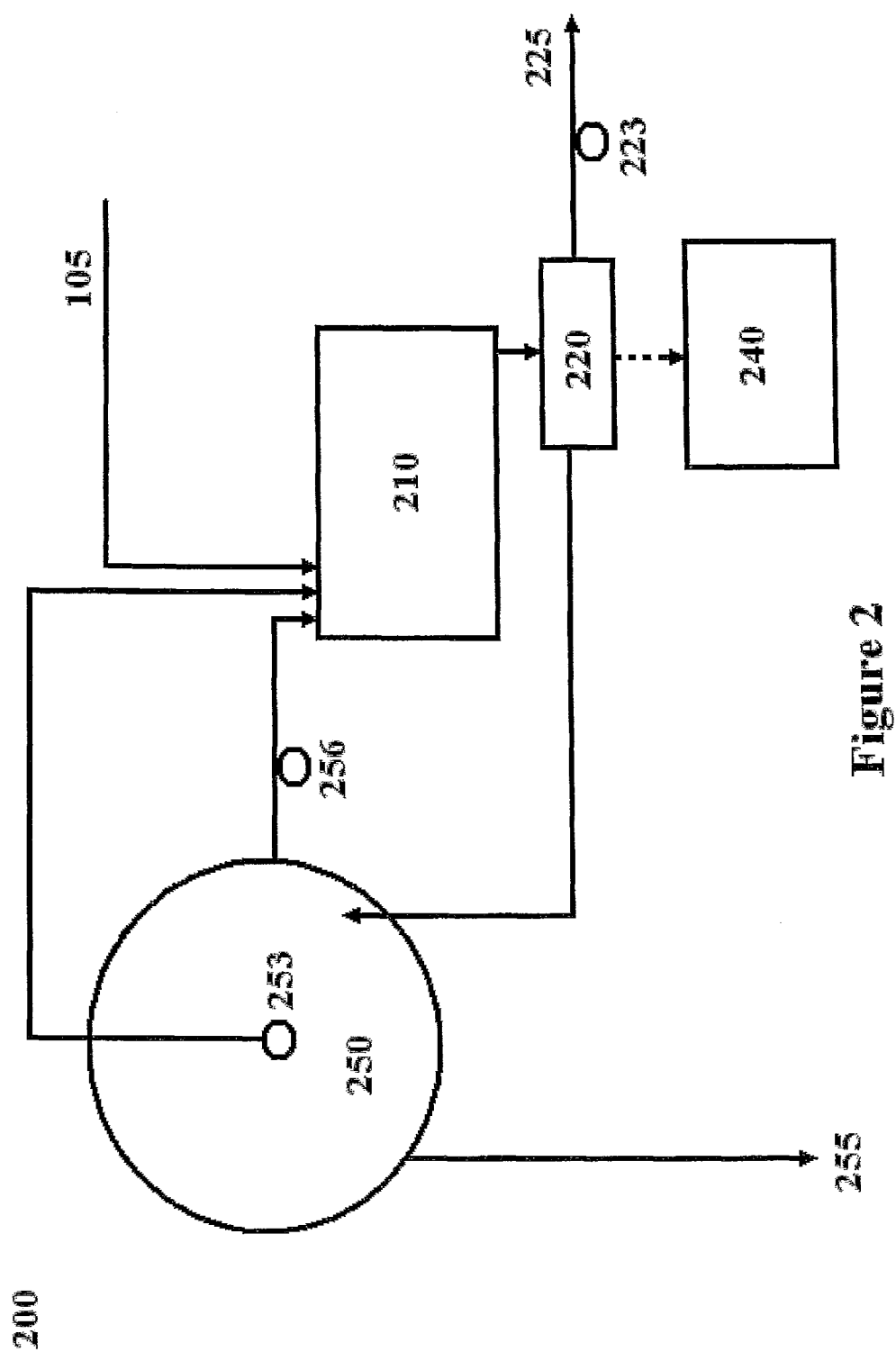
FIG. 2 is a schematic representation of a submerged environment in communication with a treatment or production system in accordance with an embodiment of the present invention.

A second modular environment, called a submerged environment 200, is shown in FIG. 2. As is the case for FIG. 1, the submerged environment is connected to a treatment or production system such as an activated sludge wastewater treatment system, a biological nutrient removal treatment system, a confined animal facility operation, a food processing facility, or the like. The submerged environment receives an influent stream 105 from the treatment or production system and may return all or part of the treated effluent stream back to that treatment or production system via pump 223 and flow path 225. The submerged environment may also send the treated effluent stream to another treatment system or may discharge part or all of the treated effluent stream as a final effluent.

The submerged environment may also include a body of media consisting of biodegradable materials such as wood chips, sawdust, agricultural wastes, and the like, or of non biodegradable materials such as plastic media structures, sand, or the like. The media may be contained within at least one, and optionally a plurality of, tanks, ponds, lagoons, or other structures capable of holding water. In certain configurations, the body of media may be arranged in nets, baskets, pens, or other containment structures which allow liquids to pass through the media but retain the media itself in a constrained volume. In FIG. 2, the body of media and water holding structure is shown as 210. Optionally, multiple containment structures, such as a plurality of nets, may house the body of media 210 housed within a water holding structure. Optionally, the water holding structure 210 may be a rectangular tank and the multiple containment structures are oriented in such a manner that liquid will flow through one of, or a series of, the containment structures. Other geometric versions of 210 may be used that accomplish this sequential flow result.

Aqueous liquids containing microbial biomasses and/or biosolids are introduced at one end or side of a series of such containment structures located within the body of media and water holding structure 210 and are allowed to flow through the media thereby exposing the contained biomasses, biosolids, and any accompanying soluble organic material or nutrients, to additional microorganisms and invertebrates which may consume, attach, or otherwise assist in removing them from the aqueous liquid. The liquid then exits the body of media 210 and passes through a selector device 220 to remove any larger invertebrates or aggregates of microorganisms which may be present in the body of media and water holding structure 210. These invertebrates or aggregates of microorganisms may be collected in organism collector 240.

Some of the liquid that passes through the selector may be pumped back to the treatment or production system by Pump 1, as shown in FIG. 2. The remainder of the liquid may be delivered to a vessel, tank, or the like, shown in FIG. 2 as 250. In some cases the selector device 220 may be modified so that invertebrates or fish grown in 210 may flow by gravity into 250. In this case, larger organisms such as fish may be grown in the receiving tank or vessel 250. Such fish may then consume the invertebrates as food.

While in the vessel 250, the liquid may be aerated or subjected to other treatment. Some fraction of this liquid may be recycled back to the influent of the submerged environment water holding structure 210. This recycled liquid may be collected from the bottom of the vessel 250 by a pump 253 such that it may collect the settleable solids that may have collected at the bottom of 250, or the recycled liquid may be collected from a space above the bottom of 250 by a second pump 256. Both pumps 253 and 256 will discharge the collected liquids at the influent end of the water holding structure in 210. A flow equal to the influent from the treatment or production system minus the return to such system and evaporative losses is discharged out of the submerged environmental module 200 via an overflow line 255 from 250. As this also constitutes a treated effluent stream, the flow may be returned back to that treatment or production system, may be sent to another treatment system, or may be discharged as a final effluent.

Figure 3:
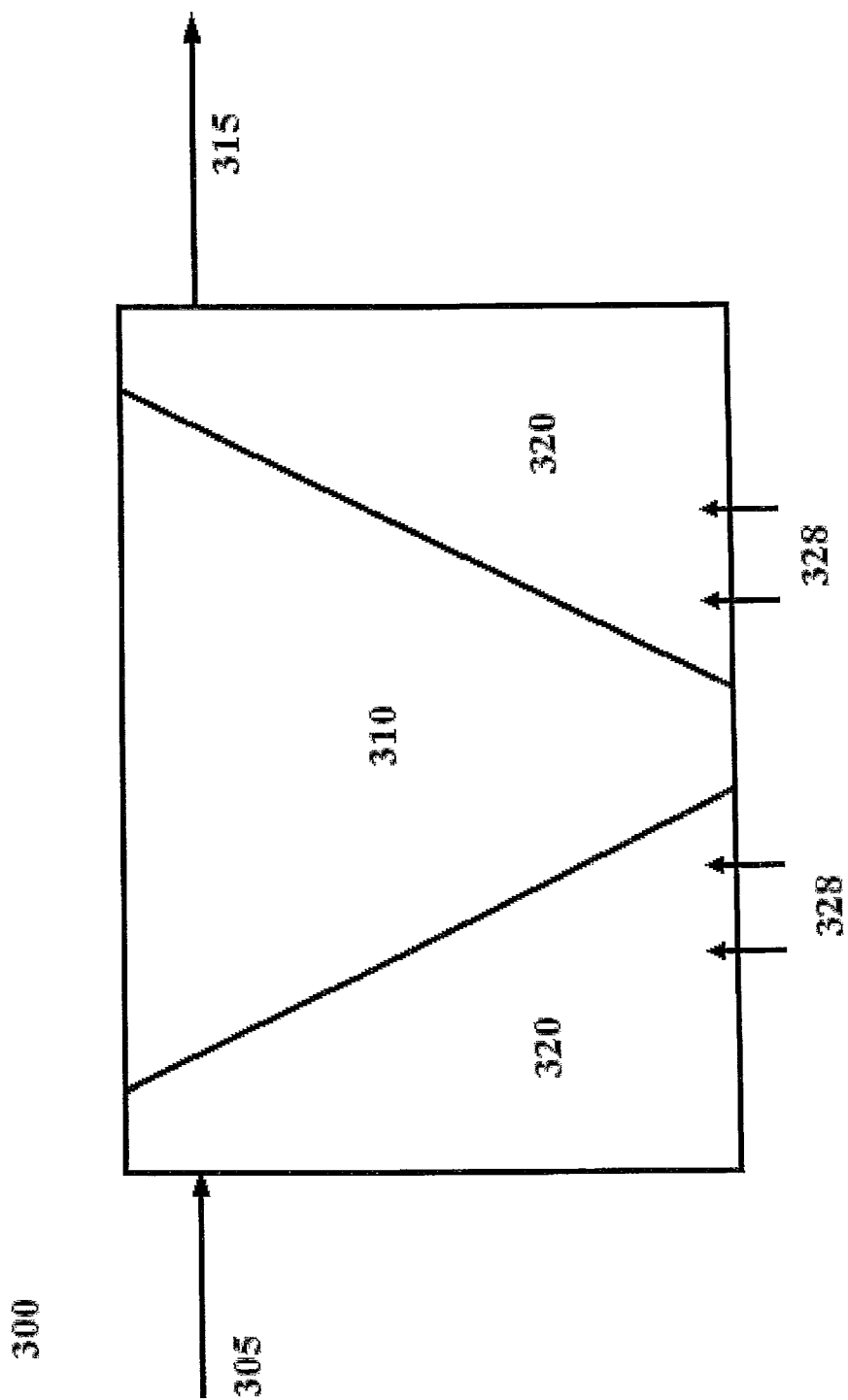
FIG. 3 is a schematic representation of a containment structure suitable for use in the submerged environment in accordance with an embodiment of the present invention.

FIG. 3 shows one configuration of a containment structure 300 that may be placed in a version, such as a rectangular version, of the body of media and water holding structure 210. In this embodiment, wood chips, or other similar media, are placed in an inverted trapezoidal cage or pen 310 within 300 that is bounded by a porous surface such as a net or grate. This separates the wood chips or other media from water zones 320, which are also within 300. The cage or pen is placed in a tank so that all influent flow 305 must pass through the cage or pen prior to exiting the system as an effluent 315. There may be several or many such cages or pens arranged in a rectangular tank version of 300 so that the influent must pass sequentially through each cage or pen 310 prior to exiting the system as an effluent stream. Aeration is usually supplied to 300 via diffusers 328 or the like.

A third modular environment, called a combined environment, combines both the irrigated environment shown in FIG. 1 and the submerged environment shown in FIG. 2. One such combined environment is shown as 400 in FIG. 4. In this case, the combined environment is also connected to a treatment or production system such as an activated sludge wastewater treatment system, a biological nutrient removal treatment system, a confined animal facility operation, a food processing facility, or the like. The combined environment receives an influent stream 105 from the treatment or production system and may return one or more treated effluent streams 910 or 920 back to that treatment or production system. The combined environment 400 may also send via flow 930 all or part of the treated effluent stream to another treatment system or may discharge part or all of the treated effluent stream as a final effluent.

Figure 4:
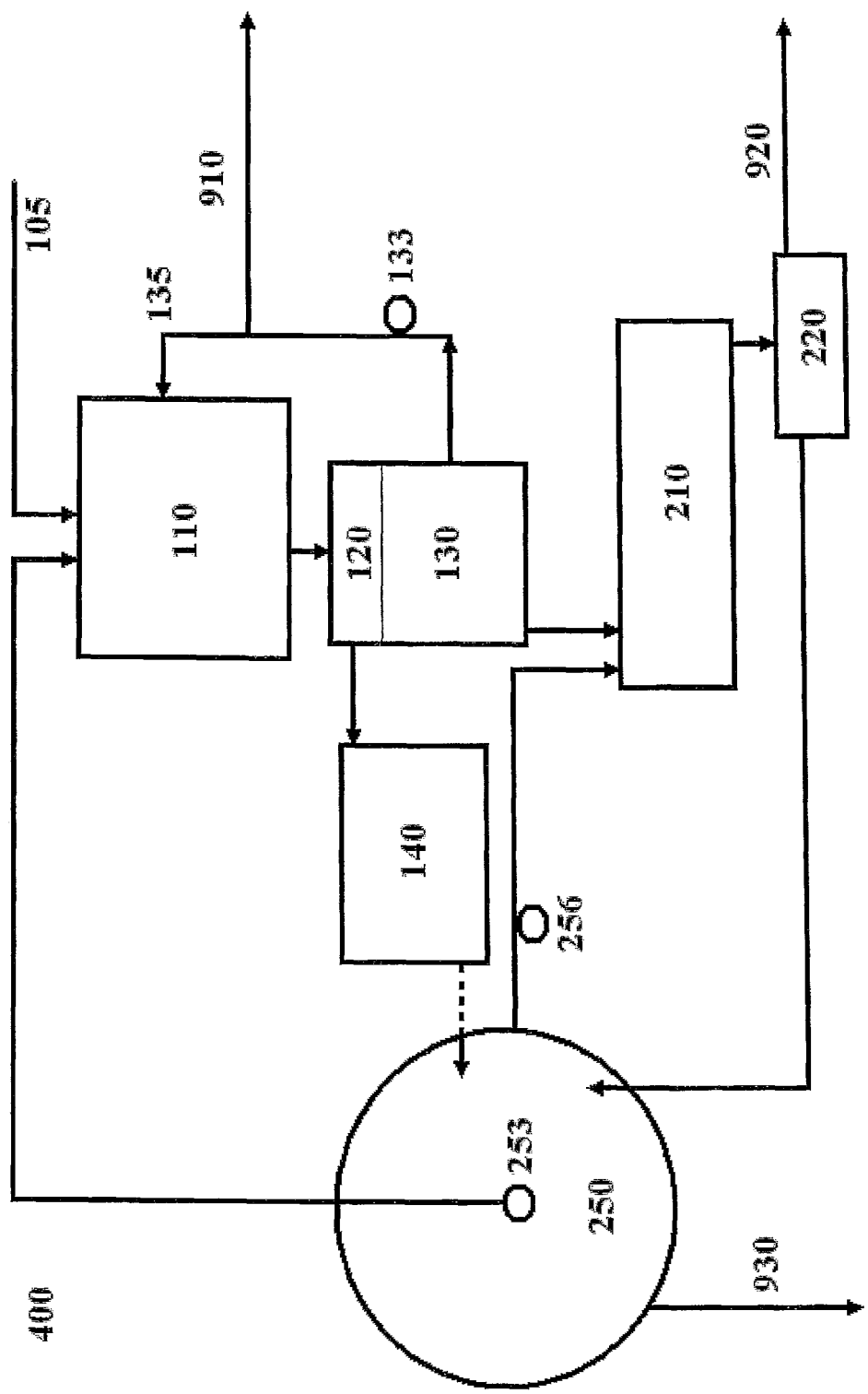
FIG. 4 is a schematic representation of a combined environment in communication with a treatment or production system in accordance with an embodiment of the present invention.

In the combined environment shown in FIG. 4, the influent from the treatment or production system comprising liquids and/or microbial biomasses or biosolids containing microorganisms, and in particular bacteria, is delivered to the top of an irrigated constrained media area 110 which is similar to the irrigated constrained media area as described relative to FIG. 1. Recycle liquids from a recycle sump 130 are also introduced to the top of the constrained media area 110. Liquid then flows through 110, passes through an organism selector 120 to selectively remove invertebrates or higher animals which are present in the combined environment 400 and/or constrained media area 110. Liquid subsequently passes into 130 and is then recycled via 135 back to the top of 110. This recycle flow usually is pumped by pump 133 and may also be diverted back to the treatment or production system via flow path 910.

Excess liquid in recycle sump 130 overflows by gravity into tank 210 which may be a submerged containment structure, as described relative to FIG. 2. Flow travels through 210 and then overflows into an organism selector 220 for selective removal of invertebrates or higher animals, as discussed above. The effluent from the selector 220 may be returned to the treatment or production system via flow path 920, or may be sent, with or without invertebrates and/or fish, to an additional tank 250 as described relative to FIG. 2. Some flow from the bottom of 250 may be pumped back to the top of 110 by pump 253, transferring settleable solids back to constrained media area 110. Other flow from 250 may be pumped back to the influent of 210 by pump 256. Any excess liquid volume in 250 overflows by gravity as a final effluent via flow path 930. Any organisms collected by the selector 120 and sequestered in 140 may be introduced into 250 where they may be consumed by fish living in 250.

In various embodiments of the process of the invention, the processes described by FIG. 1, 2, or 4 can be utilized as Bioreactor Systems which are generalized methods of treating sludges from standard activated sludge processes, Multi-Stage Activated Sludge (MSAS) processes, various biological nutrient removal (BNR) processes, or similar biological processes, for municipal, agricultural, or industrial wastewater treatment facilities. One such embodiment is shown in FIG. 5.

Figure 5:
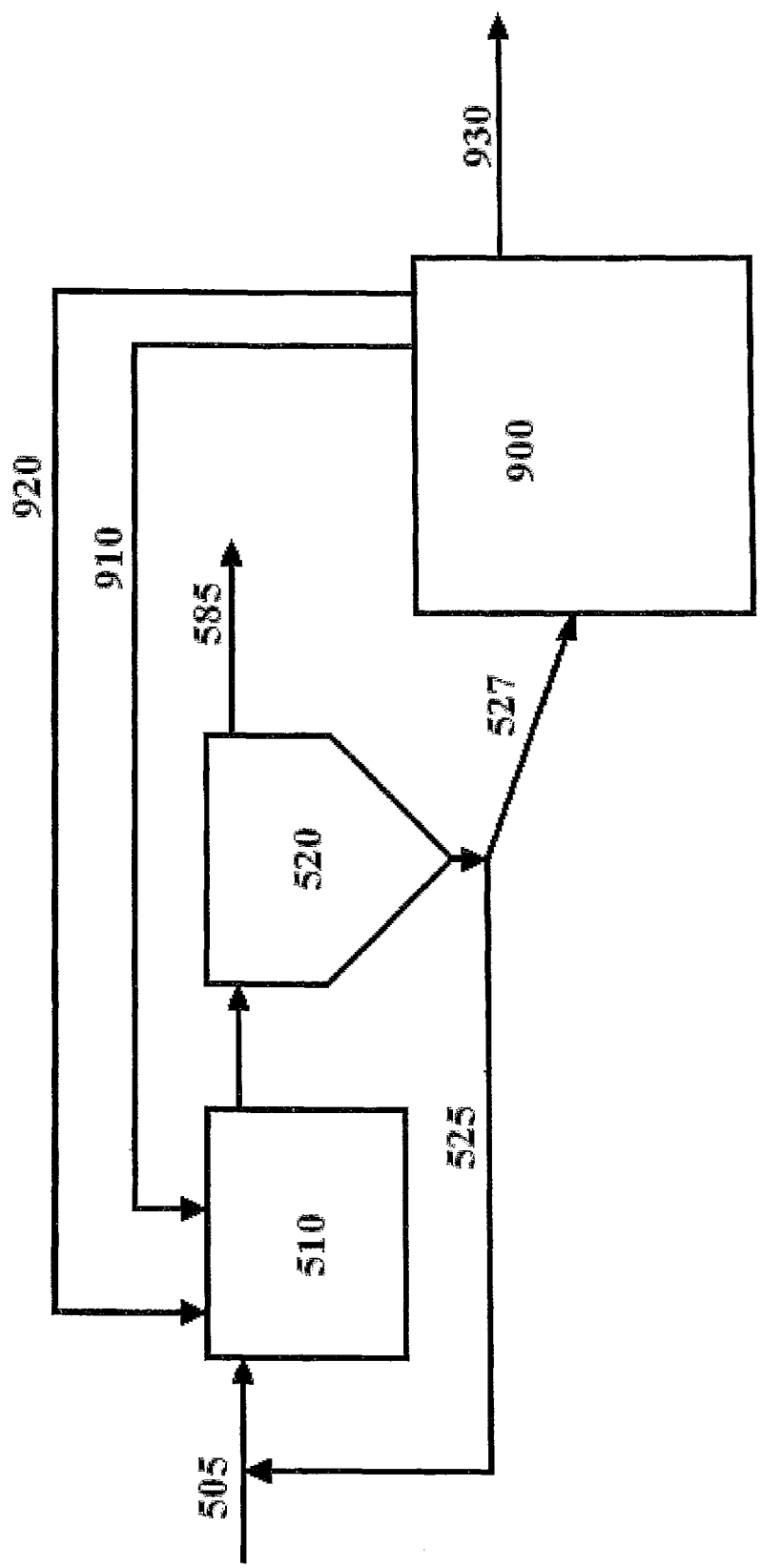
FIG. 5 is a schematic representation of an activated sludge municipal waste treatment system in communication with a treatment or production system in accordance with an embodiment of the present invention.

Referring to FIG. 5, this embodiment comprises an activated sludge municipal waste treatment system including a bioreactor 510, a clarifier 520, a Return Activated Sludge (RAS) line 525, a Waste Activated Sludge (WAS) line 527, a wastewater influent 505, and an effluent stream (Effluent #1) 585. These terms and the activated sludge process are well understood by a person skilled in the art of wastewater treatment. In this embodiment, the waste stream from the activated sludge system is introduced into a Process Environment system 900. Hereafter a Process Environment will refer to any one of: the Irrigated Environment 100 as described by FIG. 1; the Submerged Environment 200 described by FIG. 2; the Combined Environment 400 described by FIG. 4; or similar configurations of possible modular environments for the growth of microorganisms and invertebrates as described in the process of the invention.

In the embodiment of the process of the invention described by FIG. 5, the Process Environment will refer to the Combined Environment 400 as described by FIG. 4. The waste activated sludge stream 527 from the activated sludge process comprises the influent to the combined environment 400 as described in FIG. 4. Specifically it is the influent stream 105 to Tank 110 as shown in FIG. 4. This influent stream is processed by the Process Environment 900, with the flow path of the recycle loop 135 pumped by pump 133 as shown in FIG. 4, is subsequently returned to the bioreactor as described with reference to FIG. 5 via flow path 910. The organism selector 220 return to system flow 225, as shown in FIG. 2, is also returned to the bioreactor in FIG. 5 via flow path 920. The FIG. 4 effluent from Tank 250 becomes the 930 Effluent #2 flow in FIG. 5.

Periodically, the media in the modular environments comprising the Process Environments, and in particular the media in Tanks 110 or 210 as described relative to FIG. 1, 2, or 4, may need to be replaced. This is particularly true for biodegradable media such as wood chips, sawdust, agricultural wastes, and the like, but may also be the case for plastic or other inert media which may become damaged, compacted, or otherwise rendered ineffective during operation of the modular environment.

In the case where biodegradable media is used, the containment structures used within the irrigated or submerged environments as described relative to FIG. 1, 2, or 4 may be removed and replaced with similar structures containing new media. Alternatively the media within such containment structures may be mechanically or hydraulically removed by various mechanisms and replaced with new media.

Once the used media has been removed from the modular environments, residual organisms may be separated from the removed media by washing, screening, shaker conveyor, or the like. Alternatively, the organisms may be induced to leave the media through their own capacity for moving. This could include their capacity to crawl, swim, fly, or the like.

After some or all of the resident organisms have been removed from the used media, it may then be used as a substrate for other processes such as energy production or used as a byproduct for soil abatement, mulch, or material manufacture. Relative to the energy options the material could be used as a substrate for biofuel production via pyrolysis, gasification, or the like, or it could be burned directly to produce heat and steam.

In the embodiment of the process of the invention as shown in FIG. 5, the activated sludge process can be replaced with any Multi-Stage Activated Sludge (MSAS) or Biological Nutrient Removal (BNR) process, or any other biological treatment process, which produces a biological sludge as a waste product of the process. Also the modular environment as described relative to FIG. 4 could be replaced by either of the modular environments described relative to FIG. 1 or 2 or to other modular environments capable of serving similar functions.

Figure 6:
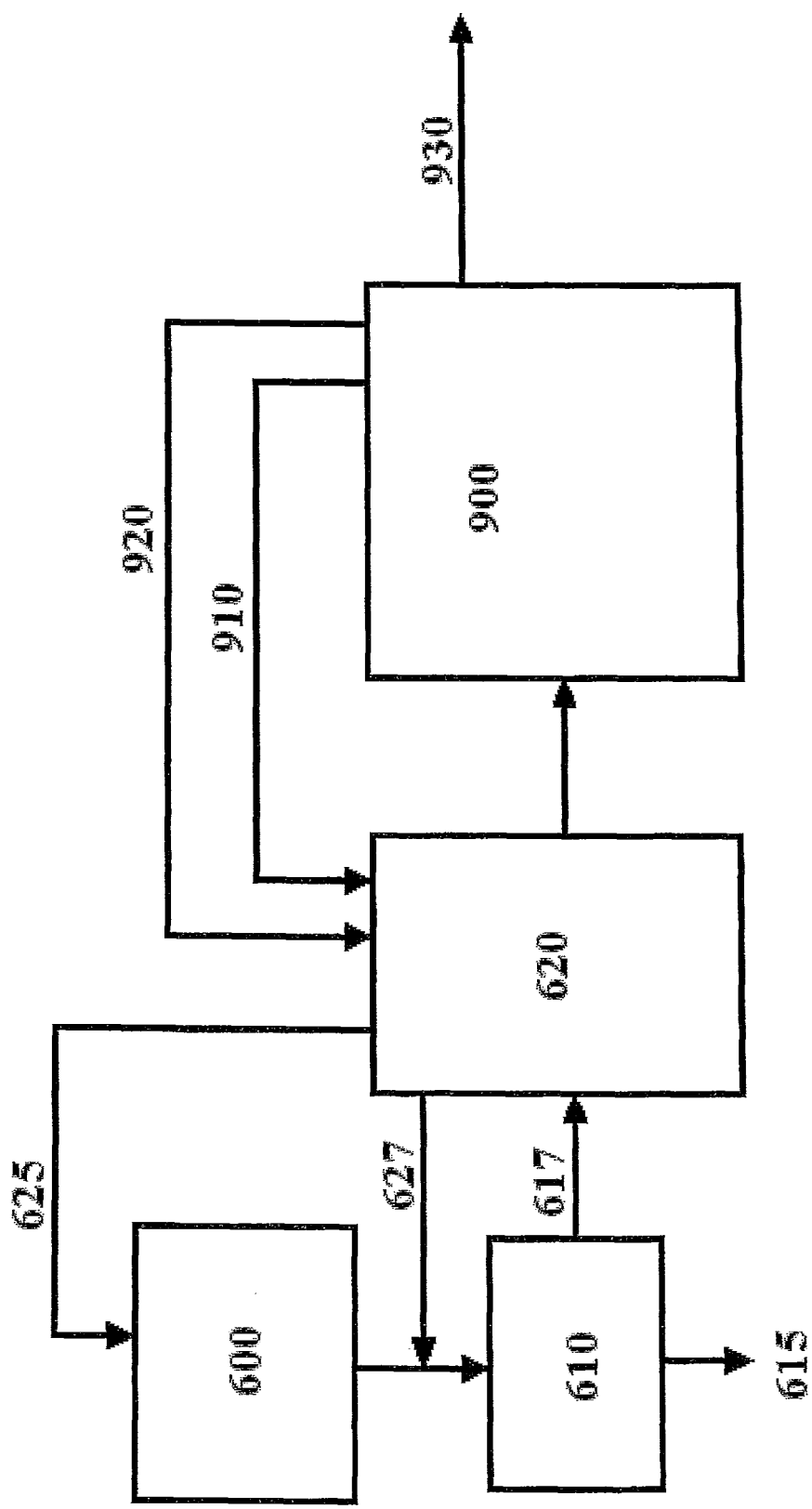
FIG. 6 is a schematic representation of a system for treating animal manure in communication with a treatment or production system in accordance with an embodiment of the present invention.

In another embodiment of the process of the invention, the processes described by FIG. 1, 2, or 4 can be combined with generalized methods of treating animal manures or other similar waste streams. FIG. 6 shows one such embodiment.

The system of FIG. 6 includes a barn or other structure for housing animals and associated structures for processing animals or animal byproducts such as milk, commonly called a Confined Animal Feeding Operation or CAFO; a solids separation system that removes some of the solids from the liquids emanating from the CAFO; a treatment system called a Bioreactor System which processes in some manner the liquids after they are separated from some of their constituent solids; and a Process Environment that further processes the liquids and solids from the treatment system and that may also utilize solids from the separator.

In one embodiment of the invention as shown in FIG. 6, the CAFO barn 600 would house dairy cows and the associated milking parlor or would house a cattle raising operation. Manure and associated wash waters and wastewaters would flow through a solids separator 610 such as a screen, screw press, or similar piece of mechanical equipment that would separate the waste stream into a solid component 615 and a liquid component 617. The liquid effluent 617 from the solids separator 610 passes into a Bioreactor System 620 where it would be subjected to treatment with a microbial process such as a regular or low oxygen nitrification-denitrification system. This Bioreactor System 620 would drive significant quantities of nitrogen to atmosphere as dimolecular nitrogen gas and would encapsulate significant quantities of phosphorus into a particulate or microbial cell mass such that it could be removed from the liquid by appropriate mechanisms.

Liquid from the Bioreactor System 620 could be recycled back to the barn for flushing via flow path 625 or could be recycled back to, and be mixed with, the manure stream emanating from the barn via flow path 627. This mixture may then be sent to the solids separation unit. The liquid effluent from the solids separation unit may then flow into the Bioreactor System 620.

An effluent stream from the Bioreactor System 620 may flow or be pumped into a Process Environment 900, such as described in FIG. 5. The Bioreactor System effluent stream may enter the Process Environment as an influent stream to constrained media tank 110, as described in FIG. 4. Output streams from the Process Environment could then be returned to the Bioreactor System 620. These would include a stream 910 emanating from the irrigated module in the Process Environment, or a stream 920 emanating from the submerged module in the Process Environment, or both. A final effluent stream 930 emanating from the Process Environment would then be sent to another treatment process or to land application or to some other method of disposal.

In the embodiment of the invention as described in FIG. 6, the media used in constrained media tank 110 and tank 210, as described in FIG. 4, could include a base of wood chips. In some cases, particularly with respect to Tank 110, a top or internal layer of separated solids from the solids separator shown in FIG. 6 may be incorporated within the constrained area. The effluent stream from the bioreactor would then be applied at the top of Tank 110 in a manner and at a flow rate such that many fine solids, microbial biomasses, and/or biosolids contained within the bioreactor effluent would be retained within the constrained area of the irrigated module in Tank 110. Many of the fine solids, microbial biomasses, and/or biosolids which passed through the constrained area would end up in Tank 130, as described in FIG. 4, and would be returned back to the top of Tank 110 by pump 133 where they would again pass through the constrained area with additional fine solids, microbial biomasses, and/or biosolids being removed from the liquid stream. Some of the tank 130 pumped stream could be returned to the bioreactor via flow path 910 for further processing.

The effluent stream from Tank 130 then flows through Tank 210 where additional fine solids, microbial biomasses, and/or biosolids are removed. After passing through a selector, as described above, some of the effluent from Tank 210 will be returned back to the bioreactor via line 920 for further processing. The rest of the effluent from Tank 210 will be sent to Tank 250. Some of the Tank 250 effluent will then be discharged as a final effluent 930.

The invertebrate and vertebrate organisms which reside within the Process Environment will consume some of the microbial biomass contained within the influent stream coming from the Bioreactor System. These higher organisms usually will range from protozoa, to any of a variety of invertebrates such as worms, insects, snails, crustaceans, or the like, or to various vertebrates such as fish or turtles. Occasionally, other vertebrate animals such as amphibians, reptiles, birds, or mammals may be used.

Once the biosolid or microbial biomass has been consumed by the higher organisms, part of the cellular structures of the microorganisms will be destroyed by the ingesting organism, and some of the carbonaceous material and nutrients will be converted into the biomass of the consuming higher organisms for growth and reproduction. The remainder of these materials will be excreted by the higher organisms.

In this embodiment of the process of the invention, some of the nitrogen that is bound in the microbial cells in the Bioreactor System effluent will be converted back into ammonium ions or free nitrogen containing compounds such as amino acids, nucleic acids, peptides, proteins, or other organic nitrogen containing compounds. By returning these materials back into the Bioreactor System, much of this nitrogen can be acted on in the Bioreactor System and converted into dimolecular nitrogen gas. This would not be the case for the whole living cells comprising the microbial biomass itself.

In the case of phosphorus, the use of appropriate vertebrate organisms within the combined environment will allow a disproportionately high amount of phosphorus, when compared with nitrogen, to be removed from the system. The incorporation of more phosphorus than nitrogen into these organisms will help compensate for the differential removal of nitrogen as dimolecular nitrogen gas in the bioreactor. If excessive amounts of nitrogen are discharged to atmosphere as dimolecular nitrogen gas, then there may not be sufficient quantities of nitrogen to generate sufficient higher animal biomass to meet desired phosphorus removal levels. In such cases, chemical precipitation of phosphorus, for example, with a metallic salt such as ferric chloride, may be required for final effluent discharge.

These processes will act to reduce the total volume and weight of solid material within the bioreactor and will also reduce the total volume and weight of solid material, nitrogen, and phosphorus which will be contained within the system effluent and which ultimately must be disposed of by land application or other similar means.

As described with reference to FIG. 5, the media in the modular environments comprising the combined environment, and in particular the media in Tanks 110 or 210 as described relative to FIG. 1, 2, or 4, may need to be periodically replaced. This can occur by removing the containment structures used within the irrigated or submerged environments as described relative to FIG. 1, 2, or 4, and replacing them with similar structures containing new media. Alternatively the media within such containment structures may be mechanically or hydraulically removed by various mechanisms and replaced with new media.

Once the used media has been removed from the modular environments, residual organisms may be separated from the media itself by washing, screening, shaker conveyor, or the like. Alternatively, the organisms may be induced to leave the media through their own capacity for moving. This could include their capacity to crawl, swim, fly, or the like.

After some or all of the resident organisms have been removed from the used media, it may then be used as a substrate for other processes such as energy production or used as a byproduct for soil abatement, mulch, or material manufacture. Relative to the energy options the material could be used as a substrate for biofuel production via pyrolysis, gasification, or the like, or it could be burned directly to produce heat and steam.

The higher organisms which result from the process of the invention can be collected for removal or other use such as feed for animals, soil conditioners, or the like.

Figure 7:
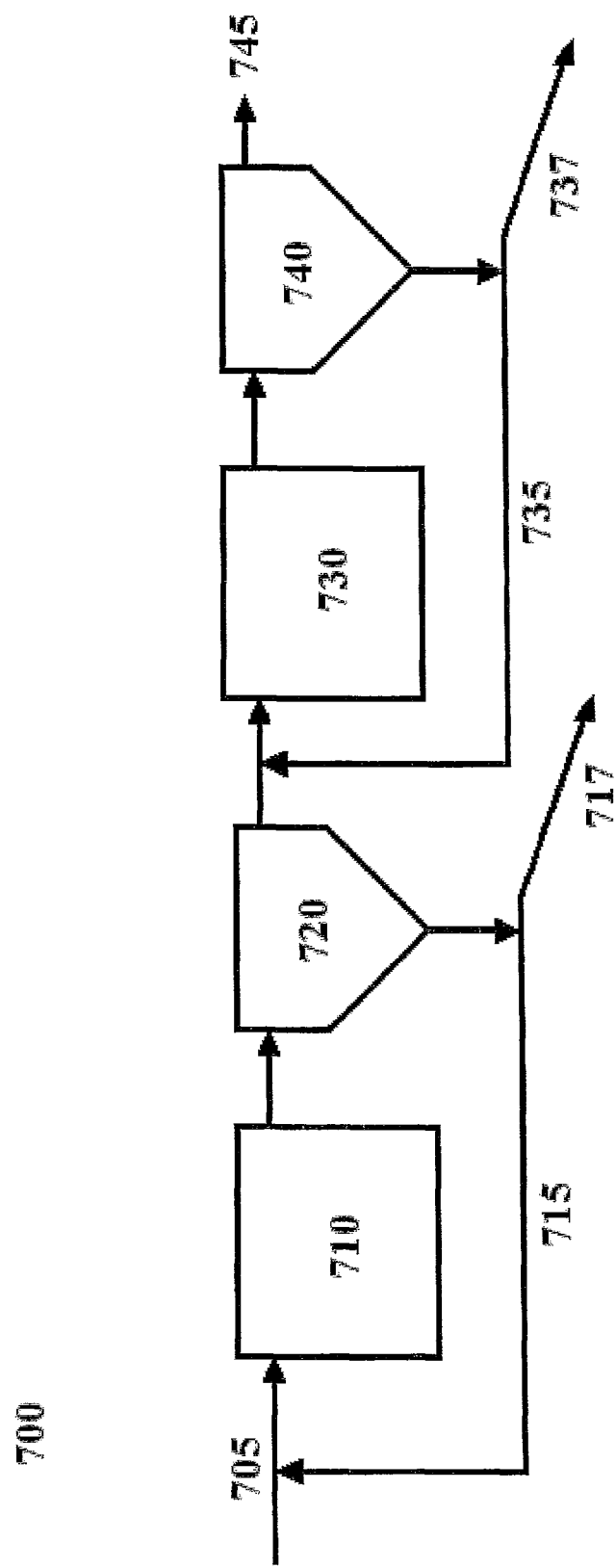
FIG. 7 is a schematic representation of a system for treating animal manure including a multi-stage activated sludge system in communication with a treatment or production system in accordance with an embodiment of the present invention.

In accordance with another embodiment of the present invention as shown in FIG. 7, a Multi Stage Activated Sludge System (MSAS) is used as a Bioreactor System 620 as shown in FIG. 6. FIG. 7 shows an MSAS 700 in which a first stage activated sludge process, comprising a bioreactor 710 and a clarifier 720, would serve to remove a significant fraction of the Biochemical Oxygen Demand (BOD) from the influent flow 705. This first stage activated sludge process includes a return activated sludge line 715 and a waste activated sludge line 717, as described relative to FIG. 5. The effluent from this first stage activated sludge process flows into a second stage activated sludge process, also comprising a bioreactor 730 and a clarifier 740, which may perform a nitrification function on the waste stream. This second stage activated sludge process may also include a return activated sludge line 735 and a waste activated sludge line 737, as described relative to FIG. 5. The total Bioreactor System 700 has an effluent flow 745 and would also drive significant quantities of nitrogen to atmosphere as dimolecular nitrogen gas. The system could be coupled to a metallic salt system that would encapsulate or precipitate significant quantities of phosphorus into a particulate form or a microbial cell mass such that it could be removed from the liquid by appropriate solids removal mechanisms.

In the embodiment incorporating an MSAS 700, as shown in FIG. 7, the Bioreactor System 620, as shown in FIG. 6, recycles flow back to the barn 625, or to the stream emanating from the barn prior to the solids separation system 627. The Waste Activated Sludge streams from both the first and second stage systems, 717 and 737, would be sent to Tank 110 in the Irrigated Module in The Process Environment (as shown in FIG. 4 as a part of FIG. 6). The Effluent flow 745 from the MSAS as shown in FIG. 7 would be sent to Tank 210 in the Submerged Module in The Process Environment (as shown in FIG. 4 as a part of FIG. 6). The flows 910 and 920 from the Process Environment could be returned, if desired, to the Bioreactor System and discharged into the second stage nitrifying bioreactor, 730. Otherwise this embodiment of the process of the invention will function in a similar manner as the first such embodiment described relative to FIG. 6.

Figure 8:
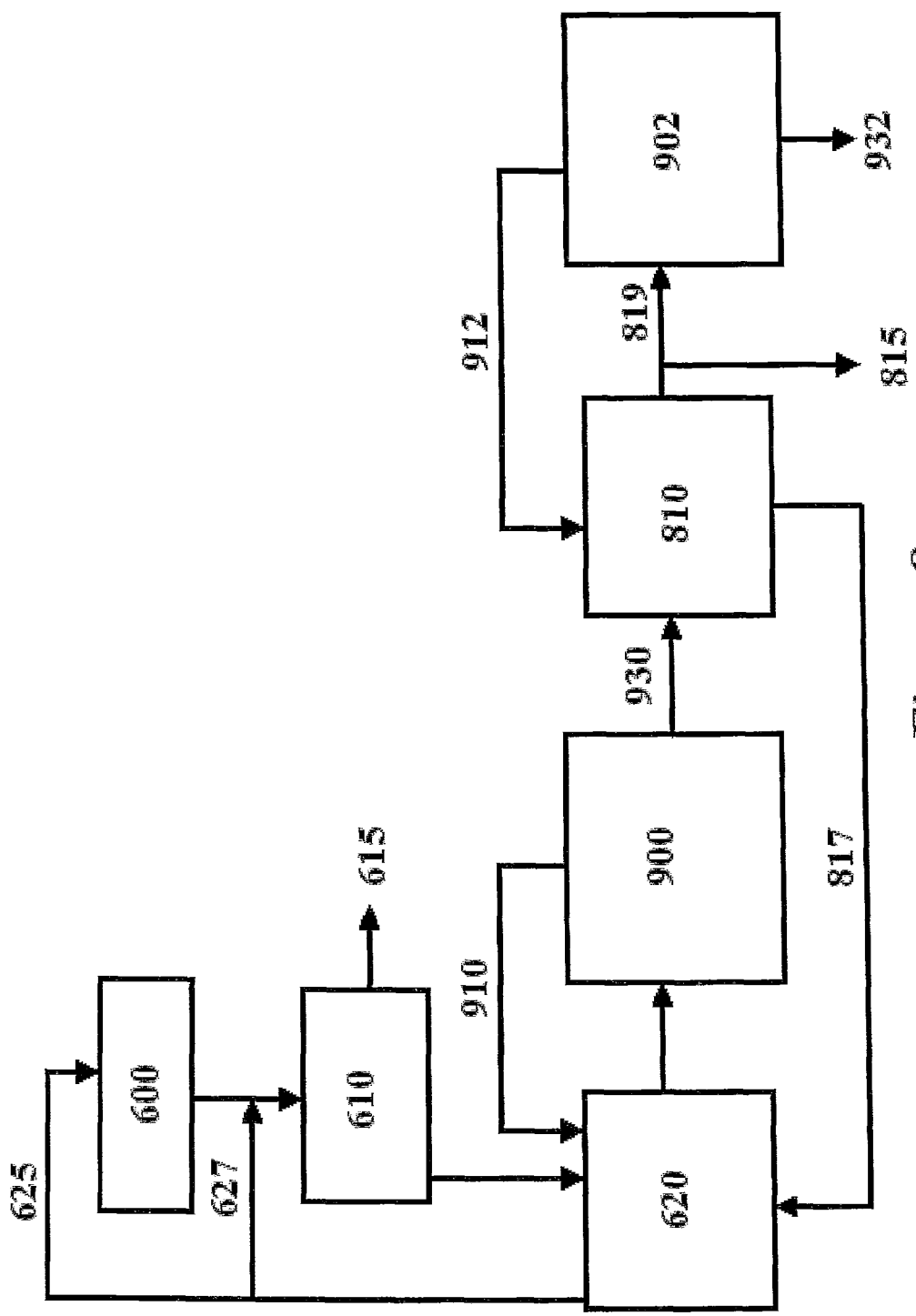
FIG. 8 is a schematic representation of a system for treating animal manure including a second low oxygen nitrification-denitrification bioreactor in communication with a treatment or production system in accordance with an embodiment of the present invention.

In a further embodiment of the process of the invention, FIG. 8 shows an extension to the generalized method of treating animal manures as described in FIG. 6. In this case, the removal of a significant fraction of the fine solids and the biosolids from the initial Bioreactor System effluent allows for efficient further processing of the liquid via additional treatment processes.

As shown in FIG. 8, a second low oxygen nitrification-denitrification Bioreactor System is added to the process as described in the first preferred embodiment described relative to FIG. 6. The system of FIG. 8 further includes a barn 600, and solids separator 610. Recycle flows from the bioreactor used to flush the barn 625 or dilute the manure stream exiting the barn prior to solids separation 627, and the Bioreactor System 620, are the same as those described relative to the first preferred embodiment of FIG. 6. Process Environment #1 900 would be the same as the Irrigated Environment 100 as shown in FIG. 1. In this case, the recycle will be returned from Process Environment #1 900 to Bioreactor System #1 620, and this would be the irrigated module return flow path 910. The Process Environment #1 effluent flow 930 would serve as the influent flow to the second Bioreactor System 810.

The significant reduction in solids achieved by Process Environment #1 allows Bioreactor System #2 810 to be configured differently than is possible with Bioreactor System #1 620. Because of the lower solids concentration in Bioreactor System #2 810, it becomes possible to grow a microbial floc which could settle by gravity or possibly be concentrated by a form of dissolved gas (air) floatation.

In the case of gravity settling, Bioreactor System #2 would have two unit processes arranged in a manner similar to an activated sludge treatment system. Thus a mixed and partially aerated suspended growth zone would be followed by a quiescent zone or clarifier in which the microbial floc could settle and be concentrated. The concentrated floc may then be returned back to the suspended growth zone. Excess solids could be returned back to Bioreactor System #1 620 via flow path 817.

In the case of floatable floc, a suspended growth zone would be followed by a Dissolved Air Floatation (DAF) unit in which tiny bubbles of gas would float and concentrate the floc so that it could be captured, removed from the DAF unit, and returned to the suspended growth zone. Similar to the discussion of the settlable floc, the excess DAF floc could be returned back to Bioreactor System #1 via flow path 817.

In one embodiment, the effluent from Bioreactor System #2 could serve as a first system effluent 815, or it could serve as an influent flow 819 to a second Process Environment, 902. An effluent flow 932 out of the second Process Environment 902, could also serve as a second system effluent, or the total system effluent could be a combination of the two effluent flows, 815 and 932.

Process Environment #2 902 could have the same configuration as system 200 in FIG. 2 with the irrigated module return to system line 910 (denoted as 912 in FIG. 8) returned to Bioreactor System #2 810. Process Environment #2 902 could also have the same configuration as system 400 as shown in FIG. 4 with the submerged module return to system line 920 shut off and the irrigated module return to system line 910 (denoted as 912 in FIG. 8) returned to Bioreactor System #2 810.

Periodic replacement of the media in both combined environments will occur as described for FIG. 6. Solids 615 from the solids separator may be included in any of the irrigated or submerged modules in either Process Environment #1, 900, or Process Environment #2, 902.

Figure 9:
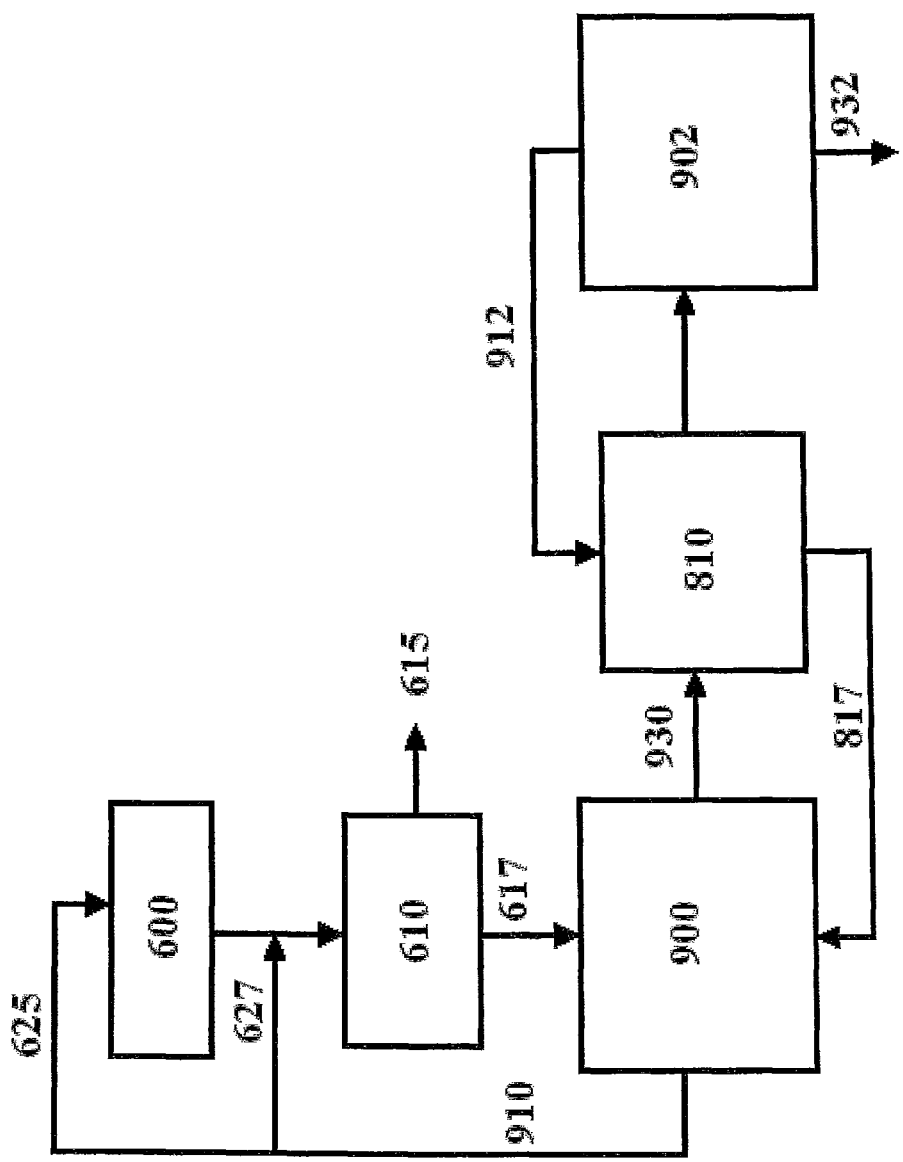
FIG. 9 is a schematic representation of a system for treating animal manure including the second low oxygen nitrification-denitrification bioreactor of FIG. 8, and having the initial bioreactor removed therefrom, in communication with a treatment or production system in accordance with an embodiment of the present invention.

In a further embodiment of the process of the invention, an initial Bioreactor System, such as Bioreactor System #1 620 in FIG. 8, may be eliminated from the entire process. This alternative is shown in FIG. 9. In this embodiment, the liquid effluent 617 from the solids separator is introduced directly into Tank 110 in an initial Process Environment #1 900 comprising 100 in FIG. 1 or 400 in FIG. 4. Alternatively, the effluent from the barn may be sent directly to Tank 110 in Process Environment #1, 900. Recycle flow rates within Process Environment #1 900 can be adjusted to accommodate for this change and the part of the recycle flow in the irrigated environment module that is returned to system 910 in FIG. 1 or FIG. 4, will be used as flush water 625 for the barn, or dilution water 627 for the manure stream exiting the barn prior to solids separation if a solids separation step is used.

In the embodiment of the process of the invention as shown in FIG. 9, Process Environment #1 900 may be the Irrigated Environment 100 as shown in FIG. 1, or it may be the Combined Environment 400 as shown in FIG. 4. The Bioreactor System 810 as shown in FIG. 9 may be the low oxygen nitrification-denitrification system 620 described relative to the first preferred embodiment of FIG. 6 or it may be the MSAS system 700 as described in FIG. 7, or it may be any of a range of BNR systems or similar nutrient removal systems. Process Environment #2 902 may be the Submerged Environment 200 as described in FIG. 2 or it may be the Combined Environment 400 as described in FIG. 4 or some other similar such environment.

Figure 10:
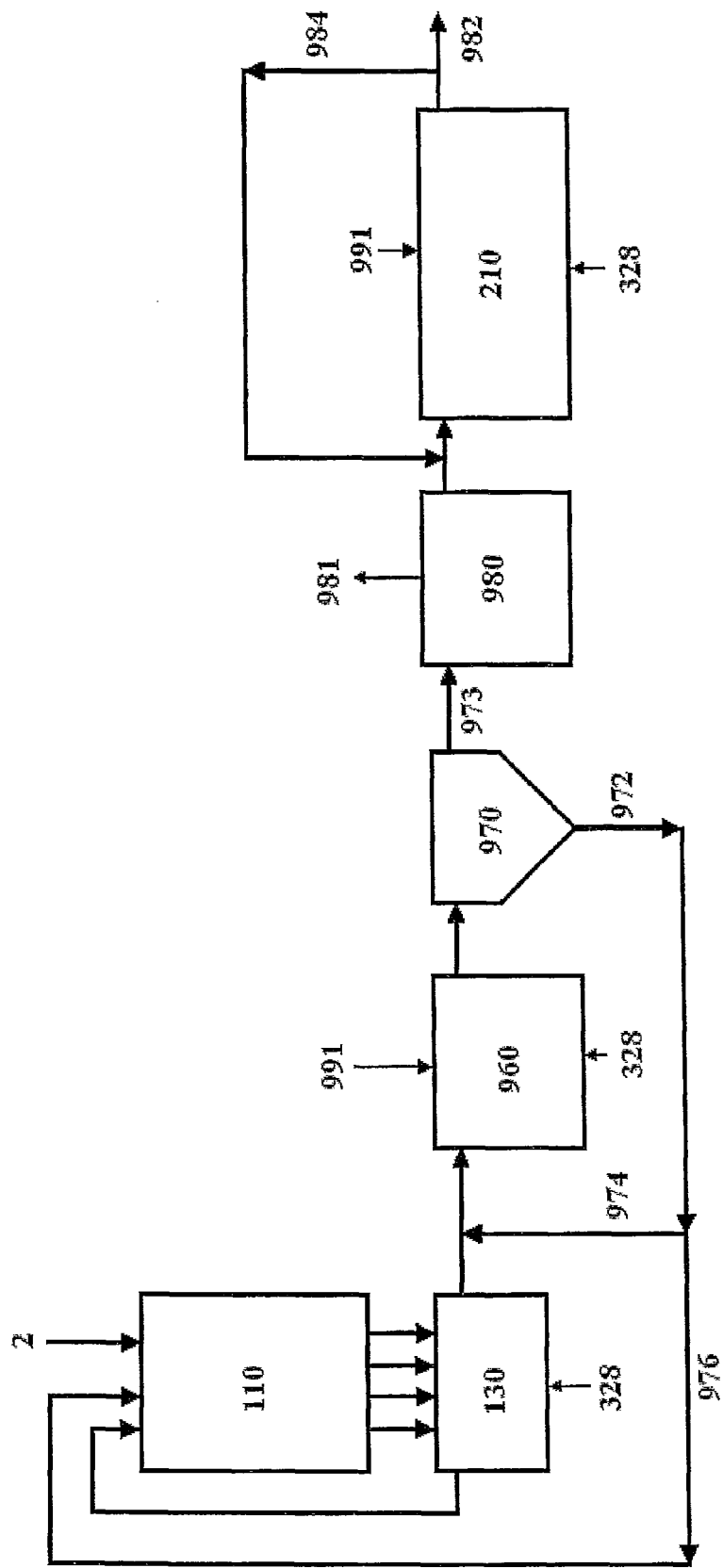
FIG. 10 is a schematic representation of a direct flow environment in communication with a treatment or production system in accordance with an embodiment of the present invention.

In accordance with yet another embodiment of the process of the invention, as generally described by FIG. 9, is shown in FIG. 10. In this embodiment, manure 2 from one or more animals such as a cow, pig, goat, sheep, chicken, turkey, fish, or other animal is introduced directly to a process environment 102 comprising an irrigated biofilter 110 such as a trickling filter or the like and a recycle sump 130. It is understood herein that the direct introduction of the manure 2 into the process environment 102 may be provided by mechanical means such as piping or mechanical shoveling, and the like. This process environment is a specific case of the general process environment previously described in FIG. 1, but the invertebrate selector 120 and collector 140 are optional and the return flow 195 is not used since manure is directly introduced into the system. Aeration 328 may be introduced in the recycle sump 130 by conventional means, as discussed above. The manure solids will be retained in the irrigated biofilter 110 and the aerated recycle sump 130 will promote the growth of aerobic microbes that will consume the soluble biochemical oxygen demand (BOD) of the influent manure stream. The consumption of the BOD may occur in the recycle sump or in the irrigated biofilter itself.

Overflow from the irrigated biofilter recycle sump 130 flows into a bioreactor system including an aerated nitrifying bioreactor 960, a clarifier 970, and an anoxic or anaerobic denitrifying bioreactor 980. The nitrifying bioreactor 960 includes at least a suspended growth zone wherein nitrifying microbes form a floc which can settle out from the liquid once they are passed to the clarifier. The underflow 972 from the clarifier 970 will contain a higher concentration of solids than will the effluent 973 from the clarifier 970. This underflow 972 will be returned to the nitrifying bioreactor via flow path 974 to concentrate the nitrifying biomass. Excess solids may be returned via flow path 976 to the influent to the irrigated biofilter. The nitrifying biomass will convert ammonia and organic nitrogen into nitrite and nitrate.

The effluent 973 from the clarifier 970 flows into a further denitrifying bioreactor which is not aerated and which may be anoxic or anaerobic. This bioreactor may contain a suspended microbial floc or it may contain a fixed media such as wood chips which support an attached biofilm. Some of the microbes in the suspended floc or attached biofilm will denitrify the soluble nitrate and nitrite produced within the aerated nitrifying bioreactor. This denitrification will result in the discharge of dimolecular nitrogen gas 981 to the atmosphere.

The effluent from the denitrifying bioreactor 980 will flow into a further process environment comprising a submerged biofilter containing wood chips or other suitable media which is configured similarly to the way that Tank 210 in FIG. 2 and FIG. 3 was configured. This submerged biofilter will function in the same manner as Tank 210 and this function is the same as that described relative to Tank 210 in FIGS. 2 and 3. Aeration will be supplied to all or part of the submerged biofilter. In the submerged biofilter some of the solids, nutrients, and BOD that are in the effluent from the denitrifying bioreactor will be removed and/or consumed by microbes residing on the surfaces of the wood chips. The final effluent 982 from the submerged biofilter will be the final effluent from the system and a fraction of this effluent may be recycled via line 984 back to the influent to the submerged biofilter.

If it is desirable to remove additional phosphorus to that removed by the various microbial biomasses, a metallic salt 991 such as ferric chloride, ferrous sulfate, or the like, may be added to the aerobic nitrifying bioreactor or to the submerged biofilter. This will precipitate phosphorus into an insoluble salt which may be removed from the system with the wood chip residues. Alternatively, a metallic salt may be added to the final effluent where a phosphorus precipitate will be formed and this can be recycled via line 984 back to the influent to the submerged biofilter and removed with the wood chip residue.

Periodically all or part of the wood chips used in the irrigated biofilter, anoxic bioreactor, or submerged biofilter will be replaced. The partially degraded chips may be washed to remove any remaining nutrients, microbial cells, and invertebrates. The remaining chips will be allowed to drain and then will be dried. The residual chips can then serve as a renewable energy source and can be burned to provide heat or subjected to various other treatments such as pyrolysis or gasification to produce a burnable fuel.

Alternatively, the residual chips may be removed from the system without being washed. The residual wood chips may then be dried and burned or used as a substrate for gasification, pyrolysis, or similar processes. Alternatively, the chips could be dried and then screened to separate a fine particulate fraction containing nutrients and a coarse particulate fraction which contains a lower relative amount of nutrients and the larger residual wood chips. The fine particulate fraction may be used as a soil amendment or plant growing medium and the large particulate fraction may also be used as a soil amendment, may be used as a mulch, or may be burned to provide heat or used as a substrate to produce burnable fuels.

In some cases in which the chip residue is burned, stack gases can be scrubbed from the incineration process and residual materials such as soot particles and nitrogen and sulfur oxides will be removed from the stack gases and trapped in a liquid scrubber stream. This scrubber stream may then be returned to the system for further removal and treatment of these particles and materials.

Since nitrogen and phosphorus are treated with different mechanisms within the process of the invention it is possible to control the relative concentrations of nitrogen and phosphorus within the solid wood chip residues and the ash fraction of any such residues that are incinerated or otherwise processed. Consequently, there are a variety of uses for such wood chip or ash residues comprising soil amendments, potting soils, fertilizers, and the like.

While the present invention was described with reference to several distinct embodiments of a treatment process, those skilled in the art may make modifications and alterations to the present invention without departing from the scope and spirit of the invention. Accordingly, the foregoing detailed description is intended to be illustrative rather than restrictive. The invention is defined by the appended claims, and all changes to the invention that fall within the meaning and the range of equivalency of the claims are embraced within their scope.

What is claimed is:

1. A process for wastewater treatment, comprising:
a waste stream containing microbes and organic constituents; and
a process environment comprising a solid media, microbes, and higher animals, the process environment having a fluid inlet for receiving the waste stream therein, the solid media comprising biodegradable non-pyrolized wood chips, the solid media supporting growth of the microbes,
wherein at least some of the microbes and/or organic constituents within the waste stream are removed from the waste stream and some of the removed microbes are destroyed or consumed by the higher animals, and
wherein the process environment has an influent and an effluent, wherein at least a portion of the effluent of the process environment is directed to the influent of the process environment through the fluid inlet.

2. The process of claim 1, wherein the process environment is an irrigated environment.

3. The process of claim 1, wherein the process environment is a submerged environment.

4. The process of claim 1, wherein the process environment is a combined environment comprising an irrigated environment and a submerged environment.

5. The process of claim 4, further comprising nitrification-denitrification bioreactors in communication with the waste stream and the process environment.

6. The process of claim 1, wherein the waste stream is an effluent stream from at least one of an activated sludge wastewater treatment system, a biological nutrient removal treatment system, a confined animal facility operation, a food processing facility, and/or a pharmaceutical processing facility.

7. The process of claim 1, wherein the waste stream comprises animal manure.

8. The process of claim 1, wherein at least some of the liquid exiting the process environment having a first total solids value is recycled into the process environment for further treatment.

9. The process of claim 8, wherein the liquid exiting the process environment after being recycled into the process environment has a second total solids value, the second total solids value being less than the first total solids value.

10. The process of claim 1, further comprising a nitrication-denitrification bioreactor in communication with the waste stream.

11. The process of claim 10, further comprising a second nitrification-denitrification bioreactor in communication with the waste stream.

12. The process of claim 10, wherein the higher animals produce at least some nitrogenous waste and a nitrification-denitrification system converts at least some of the nitrogenous waste to dimolecular nitrogen that is discharged to atmosphere.

13. The process of claim 1, further comprising an organism collector in flow communication with the waste stream of the process environment to remove at least some higher animals from the process environment.

14. The process of claim 1, wherein the waste stream comprises at least some solid material.

15. The process of claim 1, wherein the process environment comprises an irrigated biofilter.

16. The process of claim 1, further comprising nitrification-denitrification bioreactors in communication with the waste stream and the process environment.

* * * * *